US007823668B2

(12) United States Patent
Ogata et al.

(10) Patent No.: US 7,823,668 B2
(45) Date of Patent: Nov. 2, 2010

(54) CONTROL DEVICE FOR A HYBRID ELECTRIC VEHICLE

(75) Inventors: Makoto Ogata, Kanagawa (JP); Tatsuo Kiuchi, Kanagawa (JP); Kunio Sakata, Kanagawa (JP)

(73) Assignee: Mitsubishi Fuso Truck and Bus Corporation, Kawasaki-shi, Kanagawa (JP)

( * ) Notice: Subject to any disclaimer, the term of this patent is extended or adjusted under 35 U.S.C. 154(b) by 435 days.

(21) Appl. No.: 11/723,476

(22) Filed: Mar. 20, 2007

(65) Prior Publication Data

US 2007/0215395 A1 Sep. 20, 2007

(30) Foreign Application Priority Data

Mar. 20, 2006 (JP) .................. 2006-76139

(51) Int. Cl.
*B60W 10/18* (2006.01)
*B60W 10/08* (2006.01)
*G05D 17/02* (2006.01)

(52) U.S. Cl. .................. 180/65.265; 180/65.285; 903/947; 701/48

(58) Field of Classification Search ............ 180/65.265, 180/65.27, 65.275, 65.285; 903/930, 947; 701/48, 70
See application file for complete search history.

(56) References Cited

U.S. PATENT DOCUMENTS

| 4,313,080 | A | * | 1/1982 | Park | 320/123 |
| 5,101,945 | A | * | 4/1992 | Scott | 192/13 R |
| 5,722,502 | A | * | 3/1998 | Kubo | 180/65.23 |
| 5,934,395 | A | * | 8/1999 | Koide et al. | 180/65.235 |
| 6,018,198 | A | * | 1/2000 | Tsuzuki et al. | 290/17 |
| 6,135,920 | A | * | 10/2000 | Kamiya et al. | 477/185 |
| 6,209,672 | B1 | * | 4/2001 | Severinsky | 180/65.23 |
| 6,253,127 | B1 | * | 6/2001 | Itoyama et al. | 701/22 |
| 6,358,180 | B1 | * | 3/2002 | Kuroda et al. | 477/4 |
| 6,396,165 | B1 | * | 5/2002 | Nagano et al. | 307/10.6 |
| 6,428,444 | B1 | * | 8/2002 | Tabata | 477/3 |
| 6,492,741 | B1 | * | 12/2002 | Morimoto et al. | 290/40 C |
| 6,626,271 | B1 | * | 9/2003 | Böhm et al. | 188/158 |
| 2001/0013701 | A1 | * | 8/2001 | Onoyama et al. | 290/40 C |
| 2001/0028233 | A1 | * | 10/2001 | Omata et al. | 318/445 |

(Continued)

FOREIGN PATENT DOCUMENTS

JP 09 188233 7/1997

(Continued)

*Primary Examiner*—Frank B Vanaman
*Assistant Examiner*—Chiedu A Chibogu
(74) *Attorney, Agent, or Firm*—Jacobson Holman PLLC

(57) ABSTRACT

A hybrid electric vehicle is arranged such that a driving force of an electric motor can be transmitted to driving wheels and that a rotary shaft of the electric motor can be coupled with an output shaft of an engine. The vehicle comprises a starter motor provided separately from the electric motor, an electric power source provided separately from a battery that supplies power to the electric motor, to supply power to the starter motor, and a braking force maintaining device configured to be activated by power from the power source to maintain a braking force on the vehicle. When a request for starting the engine is made, if a specified abnormal condition which makes the starting of the engine by the electric motor impracticable is detected, an ECU causes the engine to be started by the starter motor when the braking force maintaining device is not active.

4 Claims, 3 Drawing Sheets

U.S. PATENT DOCUMENTS

2003/0144773 A1* 7/2003 Sumitomo .................. 701/22
2005/0000763 A1* 1/2005 Haffelder et al. ............ 188/162
2005/0017580 A1* 1/2005 Cikanek et al. ............. 303/191
2006/0108868 A1* 5/2006 Ohsaki et al. ............... 303/154

FOREIGN PATENT DOCUMENTS

| JP | 11-117837 | | 4/1999 |
| JP | 2000 064873 | | 2/2000 |
| JP | 2004291860 A | * | 10/2004 |

* cited by examiner

CONTROL DEVICE FOR A HYBRID ELECTRIC VEHICLE

BACKGROUND OF THE INVENTION

1. Field of the Invention

This invention relates to a control device for a hybrid electric vehicle, and particularly a control device for a hybrid electric vehicle arranged such that a driving force of an electric motor can be transmitted to driving wheels of the vehicle and that a rotary shaft of the electric motor can be coupled with an output shaft of an engine.

2. Description of the Related Art

A so-called parallel hybrid electric vehicle capable of transmitting a driving force of an engine and a driving force of an electric motor to driving wheels of the vehicle has been developed and come into practical use.

In such hybrid electric vehicle, since the output shaft of the engine can be coupled with the rotary shaft of the electric motor, the engine can be started using a driving force of the electric motor that is operated as a motor.

A hybrid electric vehicle arranged such that the engine is started using the driving force of the electric motor in this manner is proposed in Unexamined Japanese Patent Publication No. 2000-64873 (hereinafter referred to as Patent Document 1), for example.

In the case of the hybrid electric vehicle shown in Patent Document 1, when the vehicle which is being driven only by the electric motor with the engine stopped requires a great driving force for a rapid acceleration of the vehicle or the like, the engine is automatically started by the electric motor so that also the engine supplies a driving force. In this hybrid electric vehicle, when the voltage of the battery has decreased to or below a set value, or when a cranking signal from the engine is not detected, the engine cannot be started by the electric motor. Thus, the engine is started by a starter motor in place of the electric motor.

Meanwhile, in order to start traveling of the vehicle on a slope easily, there has been developed and come into practical use a braking force maintaining device for maintaining a braking force on a vehicle at rest on a slope. The braking force maintaining device is arranged to terminate the maintaining of the braking force according to a driver's manipulation for starting the vehicle. An electric vehicle provided with such braking force maintaining device is proposed in Unexamined Japanese Patent Publication No. Hei 9-188233 (hereinafter referred to as Patent Document 2).

The braking force maintaining device shown in Patent Document 2 includes a solenoid valve for supplying a hydraulic pressure to a wheel cylinder for producing a braking force, where the braking force is maintained by activating a solenoid of the solenoid valve, thereby closing the solenoid valve.

When such braking force maintaining device is applied to the hybrid electric vehicle of Patent Document 1, however, the starter motor and the braking force maintaining device share the same electric power source. Thus, there is a possibility that when the starter motor is operated, the power source voltage drops, so that the solenoid valve of the braking force maintaining device cannot be held closed. Consequently, there is a problem that if the solenoid valve is temporality opened due to the operation of the starter motor, the maintaining of the braking force by the braking force maintaining device is accidentally broken off.

In particular, in recent years, vehicles provided with an engine having a so-called idling stop function, namely a function of stopping the engine when the vehicle is at rest, have come into practical use. Thus, if the braking force maintaining device and the idling stop function are applied to the hybrid electric vehicle of Patent Document 1, such problem may happen frequently, since the engine is started/stopped frequently.

SUMMARY OF THE INVENTION

An aspect of the present invention is directed to a control device for a hybrid electric vehicle arranged such that a driving force of an electric motor can be transmitted to driving wheels and that a rotary shaft of the electric motor can be coupled with an output shaft of an engine, comprising: a starter motor provided separately from the electric motor and capable of starting the engine by transmitting a driving force to the output shaft of the engine; a battery that supplies electric power to the electric motor; an electric power source provided separately from the battery to supply electric power to the starter motor; a braking force maintaining means configured to be activated by electric power from the electric power source to maintain a braking force on the vehicle; an abnormality detection means for detecting a specified abnormal condition which makes the starting of the engine by the electric motor impracticable; and a control means which, in a case where a request for starting the engine is made, if the abnormality detection means does not detect the abnormal condition, causes the engine to be started by the electric motor, and if the abnormality detection means detects the abnormal condition, causes the engine to be started by the starter motor when the braking force maintaining means is not active.

BRIEF DESCRIPTION OF THE DRAWINGS

The present invention will become more fully understood from the detailed description given hereinafter and the accompanying drawings which are given by way of illustration only, and thus, are not limitative of the present invention, and wherein.

DETAILED DESCRIPTION OF THE INVENTION

Referring to the attached drawings, an embodiment of the present invention will be described below.

Figure 1:
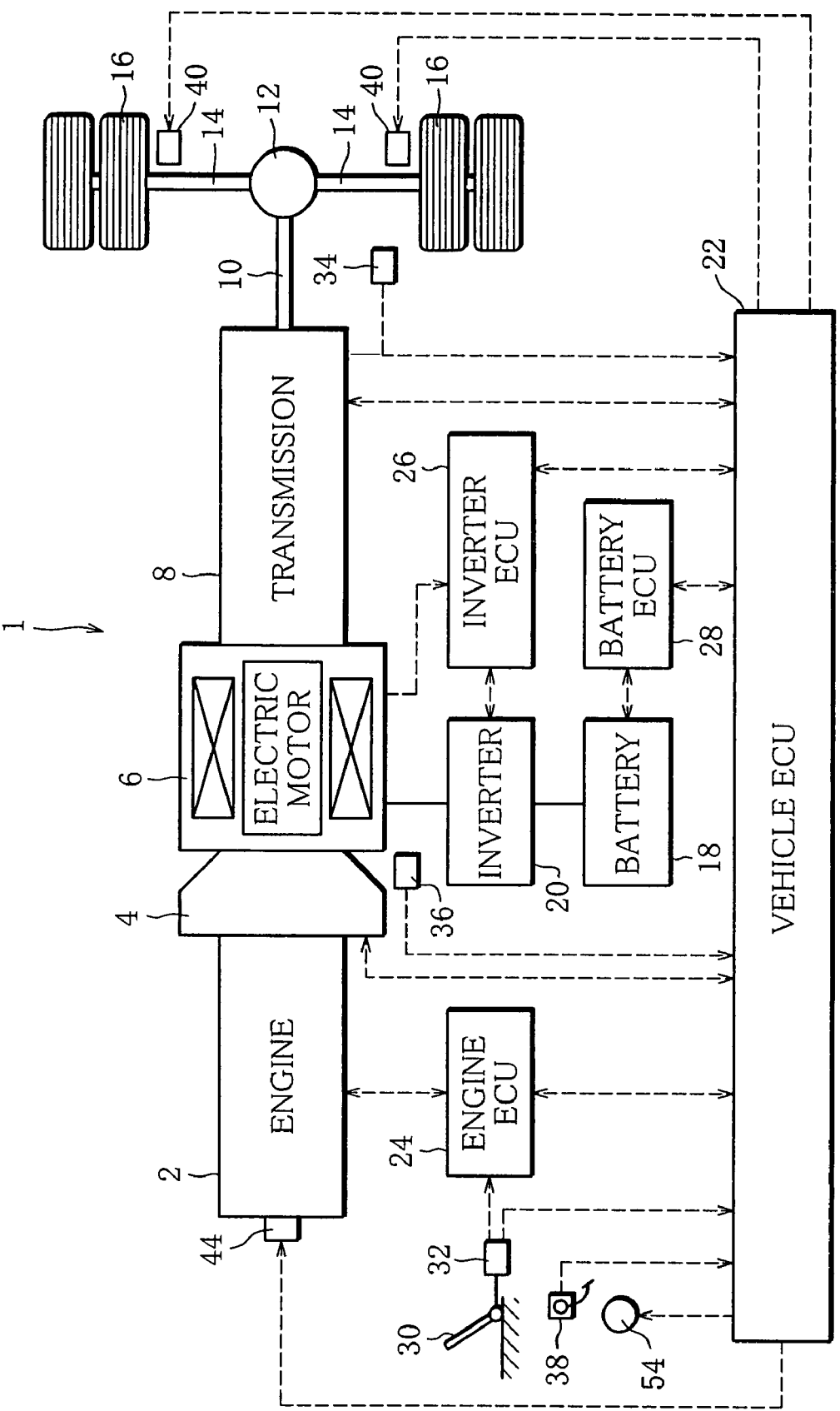
FIG. 1 is a diagram showing the schematic structure of a hybrid electric vehicle to which an embodiment of the present invention is applied.

FIG. 1 is a diagram showing the schematic structure of a hybrid electric vehicle 1 to which the present invention is applied.

An input shaft of a clutch 4 is coupled to an output shaft of an engine 2, which is a diesel engine. An output shaft of the clutch 4 is coupled to an input shaft of an automatic transmission (hereinafter referred to as transmission) 8 through a rotary shaft of a permanent-magnetic synchronous electric motor (hereinafter referred to as electric motor) 6. An output shaft of the transmission 8 is connected to left and right driving wheels 16 through a propeller shaft 10, a differential gear unit 12 and driving shafts 14.

Thus, when the clutch 4 is engaged, the output shaft of the engine 2 and the rotary shaft of the electric motor 6 are connected together, and both can be mechanically connected with the driving wheels 16. Meanwhile, when the clutch 4 is disengaged, the output shaft of the engine 2 and the rotary shaft of the electric motor 6 are disconnected, and only the rotary shaft of the electric motor 6 can be mechanically connected with the driving wheels 16.

The electric motor 6 is operated as a motor when DC power stored in a battery 18 is supplied to the electric motor after being converted into AC power by an inverter 20. A driving torque of the electric motor 6 is transmitted to the driving wheels 16 after being shifted to a proper speed by the transmission 8. In deceleration of the vehicle, the electric motor 6 is operated as a generator. Kinetic energy created by the revolution of the driving wheels 16 is transmitted to the electric motor 6 through the transmission 8 and converted into AC power, thereby producing a decelerating torque based on a regenerative braking force. This AC power is converted into DC power by the inverter 20 and is then stored in the battery 18. In this manner, the kinetic energy created by the revolution of the driving wheels 16 is recovered as electrical energy.

Meanwhile, when the clutch 4 is engaged, a driving torque of the engine 2 is transmitted to the transmission 8 through the rotary shaft of the electric motor 6. After being shifted to an appropriate speed, the driving torque of the engine 2 is transmitted to the driving wheels 16. Thus, when the electric motor 6 is operated as a motor while the driving torque of the engine 2 is transmitted to the driving wheels 16, both the driving torque of the engine 2 and the driving torque of the electric motor 6 are transmitted to the driving wheels 16. In other words, a part of the driving torque to be transmitted to the driving wheels 16 to drive the vehicle is supplied from the engine 2, and at the same time, the rest of the driving torque is supplied from the electric motor 6.

If a storage rate (hereinafter referred to as SOC) of the battery 18 lowers and the battery 18 requires to be charged, the electric motor 6 is operated as a generator. The electric motor 6 is driven by using a part of the driving torque of the engine 2 to thereby carry out power generation. The AC power thus generated is converted into DC power by the inverter 20, and the battery 18 is charged with this DC power.

A vehicle ECU 22 (control means) performs a engagement/disengagement control of the clutch 4 and a gear shift control of the transmission 8, depending on the operating state of the vehicle represented by, for example the traveling speed of the vehicle detected by a vehicle speed sensor 34, the operating state of the engine 2, the revolution speed of the electric motor 6 detected by a revolution speed sensor 36, information from an engine ECU 24, an inverter ECU 26 and a battery ECU 28, etc. The vehicle ECU 22 also performs an integrated control to operate the engine 2 and the electric motor 6 appropriately, according to the state of these controls and the operating state of the vehicle such as start, acceleration, or deceleration of the vehicle.

When the vehicle is at rest, for example waiting for a traffic light to change or due to a traffic jam, the vehicle ECU 22 performs an idling stop control to automatically stop the engine 2 temporarily. Specifically, when the predetermined conditions for stopping the engine are met, the vehicle ECU 22 instructs the engine ECU 24 to stop the engine 2. Receiving the instruction, the engine ECU 24 stops the engine 2 by shutting off fuel supply to the engine 2.

In the present embodiment, the conditions set for stopping the engine 2 in the idling stop control are that the traveling speed detected by the vehicle speed sensor 34 is 0 km/h, that depression of a brake pedal 38 has been detected, that the transmission 8 is in N (neutral) range, and the like.

With the engine 2 stopped under the idling stop control, when the predetermined conditions for starting the engine are met, the vehicle ECU 22 instructs the engine ECU 24 to operate the engine 2, and performs a later-described engine start control to crank the engine 2. Receiving the instruction, the engine ECU 24 resumes fuel supply to the engine 2 so that the cranked engine 2 restarts.

In the present embodiment, the conditions set for starting the engine 2 in the idling stop control are that release of the brake pedal 38 has been detected, and that the transmission 8 is in a traveling range such as D (drive) range.

In addition to performing the above-described start/stop controls of the engine 2 on the basis of information from the vehicle ECU 22, the engine ECU 24 performs a variety of controls required for the operation of the engine 2 per se, such as an idling control of the engine 2, and a regeneration control of an exhaust gas purification device (not shown). Further, the engine ECU 24 controls fuel injection quantity, fuel injection timing, etc. for the engine 2 so that the engine 2 generates a torque required in the engine 2, which is set by the vehicle ECU 22.

The inverter ECU 26 monitors the state of the electric motor 6 and the inverter 20 such as the temperature thereof and feeds the information obtained to the vehicle ECU 22. Further, the inverter ECU 26 controls the inverter 20 on the basis of a torque to be generated by the electric motor 6 which is set by the vehicle ECU 22, thereby controlling the electric motor 6 to operate the electric motor 6 as a motor or as a generator.

The battery ECU 28 detects the temperature of the battery 18, the voltage of the battery 18, a current flowing between the inverter 20 and the battery 18, etc. The battery ECU 28 also obtains the SOC of the battery 18 from these detection results and feeds the obtained SOC to the vehicle ECU 22, together with the detection results.

Transferring information to and from these engine ECU 24, inverter ECU 26 and battery ECU 28, the vehicle ECU 22 instructs the engine ECU 24 and the inverter ECU 26 to control the engine 2 and the electric motor 6 appropriately. In this process, the vehicle ECU 22 controls the clutch 4 and the transmission 8 appropriately.

When performing these controls, the vehicle ECU 22 calculates a requested torque required for the vehicle to travel, on the basis of detection results fed from an accelerator opening sensor 32 for detecting the depression amount of an accelerator pedal 30, the vehicle speed sensor 34 and the revolution speed sensor 36. Further, the vehicle ECU 22 distributes the requested torque between the engine 2 and the electric motor 6 depending on the current operating state of the vehicle, and the current operating state of the engine 2 and the electric motor 6, on the basis of information from each ECU. The vehicle ECU 22 feeds an instruction designating a torque assigned to each, to the engine ECU 24 and the inverter ECU 26, and controls the transmission 8 and the clutch 4 as necessary.

When the requested torque is assigned only to the electric motor 6 and not to the engine 2, the vehicle ECU 22 disengages the clutch 4 and instructs the inverter ECU 26 to control the electric motor 6 to produce the requested torque.

The engine ECU 24 controls the engine 2 to idle, while the inverter ECU 26 controls the inverter 20 on the basis of the torque designated by the vehicle ECU 22, so that DC power of the battery 18 is converted into AC power by the inverter 20 and supplied to the electric motor 6. Supplied with AC power, the electric motor 6 is operated as a motor, thereby generating the requested torque. The output torque of the electric motor 6 is transmitted to the driving wheels 16 through the transmission 8.

When the requested torque is distributed between the engine 2 and the electric motor 6, the vehicle ECU 22 engages the clutch 4. Further, the vehicle ECU 22 feeds an instruction designating an output torque assigned to the engine 2, to the engine ECU 24, and an instruction designating an output torque assigned to the electric motor 6, to the inverter ECU 26.

The engine ECU 24 controls the engine 2 to produce the torque designated by the vehicle ECU 22, while the inverter ECU 26 controls the inverter 20 according to the torque designated by the vehicle ECU 22. Consequently, the requested torque is produced as the sum of the output torque of the engine 2 and the torque of the electric motor 6, and transmitted to the driving wheels 16 through the transmission 8.

Meanwhile, when the requested torque is assigned only to the engine 2 and not to the electric motor 6, the vehicle ECU 22 engages the clutch 4. The vehicle ECU 22 further instructs the engine ECU 24 to control the engine 2 to produce the requested torque and instructs the inverter ECU 26 to set the output torque of the electric motor 6 to zero.

The engine ECU 24 controls the engine 2 to produce the requested torque designated by the vehicle ECU 22, while the inverter ECU 26 controls the inverter 20 so that the electric motor 6 is operated neither as a motor nor as a generator. Consequently, the requested torque generated by the engine 2 is transmitted to the driving wheels 16 through the transmission 8.

The left and right driving wheels 16 are each provided with a solenoid valve (braking force maintaining means) 40 for supplying a hydraulic pressure to a wheel cylinder (not shown) of the driving wheels 16. By activating a solenoid (not shown) of the solenoid valve 40, the hydraulic pressure in the wheel cylinder is maintained, so that the braking force applied to the driving wheel 16 is maintained. It is to be noted that such solenoid valve 40 is also provided to each driven wheel (not shown), where the braking force on the driven wheel is likewise maintained by activating the solenoid.

Figure 2:
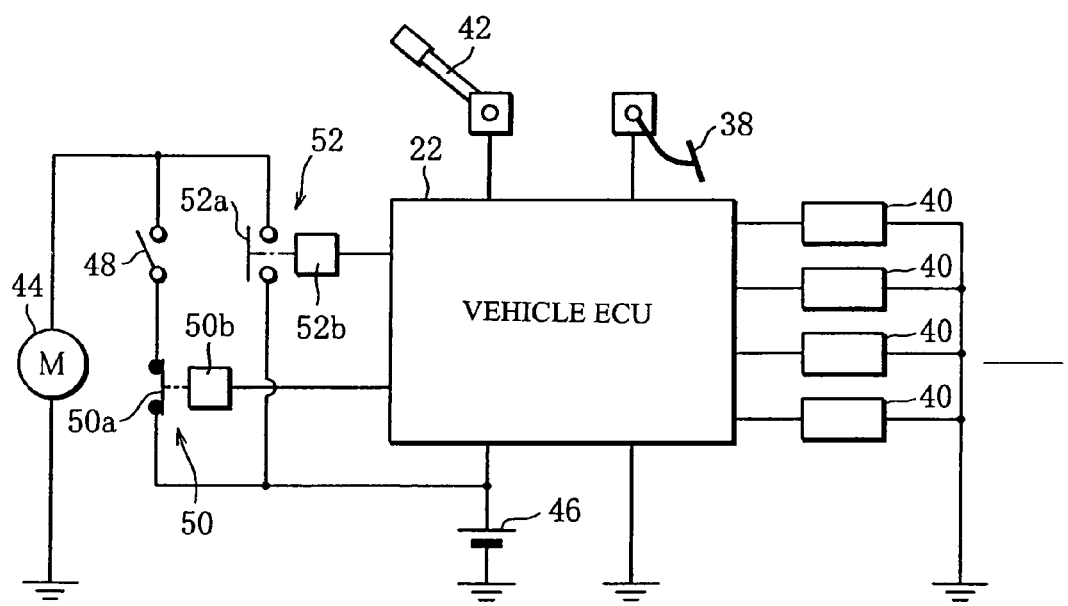
FIG. 2 is a connection diagram for the hybrid electric vehicle of FIG. 1, with a vehicle ECU at the center.

As shown in FIG. 2, the solenoid valves 40 are electrically connected with the vehicle ECU 22 and the activation of the solenoid valves 40 is controlled by the vehicle ECU 22. For example, when the brake pedal 38 is depressed so that the vehicle comes to rest, the vehicle ECU 22 activates the solenoid of each solenoid valve 40 to maintain the braking force. When a parking brake 42 is operated to produce a braking force, when the brake pedal 38 is once released and then depressed again, or when the accelerator pedal 30 is depressed, the vehicle ECU 22 deactivates the solenoid valve 40, thereby terminating the maintaining of the braking force. Since such braking force maintaining control is the same as that of well-known braking force maintaining device, the description thereof will be omitted.

Since the rotary shaft of the electric motor 6 can be coupled with the output shaft of the engine 2 by the clutch 4, the engine 2 can be started by operating the electric motor 6 as a motor. However, taking account of the case in which, due to some reason, the electric motor 6 cannot produce a torque required to start the engine 2, a starter motor 44 is provided for the engine 2, separately from the electric motor 6.

Since the starter motor 44 is the same as an engine starter motor provided to common vehicles having only an engine 2 as a driving source, the detailed description thereof will be omitted. The starter motor 44 includes a pinion gear (not shown) that can be brought into engagement with a ring gear (not shown) provided at the end of the output shaft of the engine 2. The starter motor 44 is arranged such that the output shaft of the engine 2 is driven by the pinion gear which engages with the ring gear and thereby the engine 2 can be started.

The starter motor 44 is operated by electric power supplied from a power-source battery (electric power source) 46 provided separately from the battery 18. The power-source battery 46 is also used as an electric power source for the activation of the solenoid of each solenoid valve 40 performed by the vehicle ECU 22. Further, the power-source battery 46 supplies electric power not only to the starter motor 44 but also to a variety of devices and sensors, including the vehicle ECU 22, the inverter ECU and the battery ECU 28, used in the controls of operation of the engine 2, the clutch 4 and the transmission 8.

As shown in FIG. 2, the starter motor 44 is electrically connected to the power-source battery 46 through a contact of a starter switch 48 and a contact 50a of a cut relay 50. With the contact 50a of the cut relay 50 closed, when the starter switch 48 is put in an engine start position so that the contact of the starter switch 48 is closed, electric power is supplied from the power-source battery 46 to the starter motor 44 to crank the engine 2.

The contact 50a of the cut relay 50 is a normally closed contact. When the engine 2 is to be started by the electric motor 6, in order to prevent the starter motor 44 from starting the engine 2 at the same time, a solenoid 50b of the cut relay 50 is activated by a control signal from the vehicle ECU 22 to open the contact 50a to thereby shut off electric power supply from the power-source battery 46 to the starter motor 44.

Apart from this, the starter motor 44 is electrically connected to the power-source battery 46 through a contact 52a of a control relay 52. When a solenoid 52b of the control relay 52 is activated by a control signal from the vehicle ECU 22, the contact 52a is closed so that electric power is supplied from the power-source battery 46 to the starter motor 44 to crank the engine 2.

Figure 3:
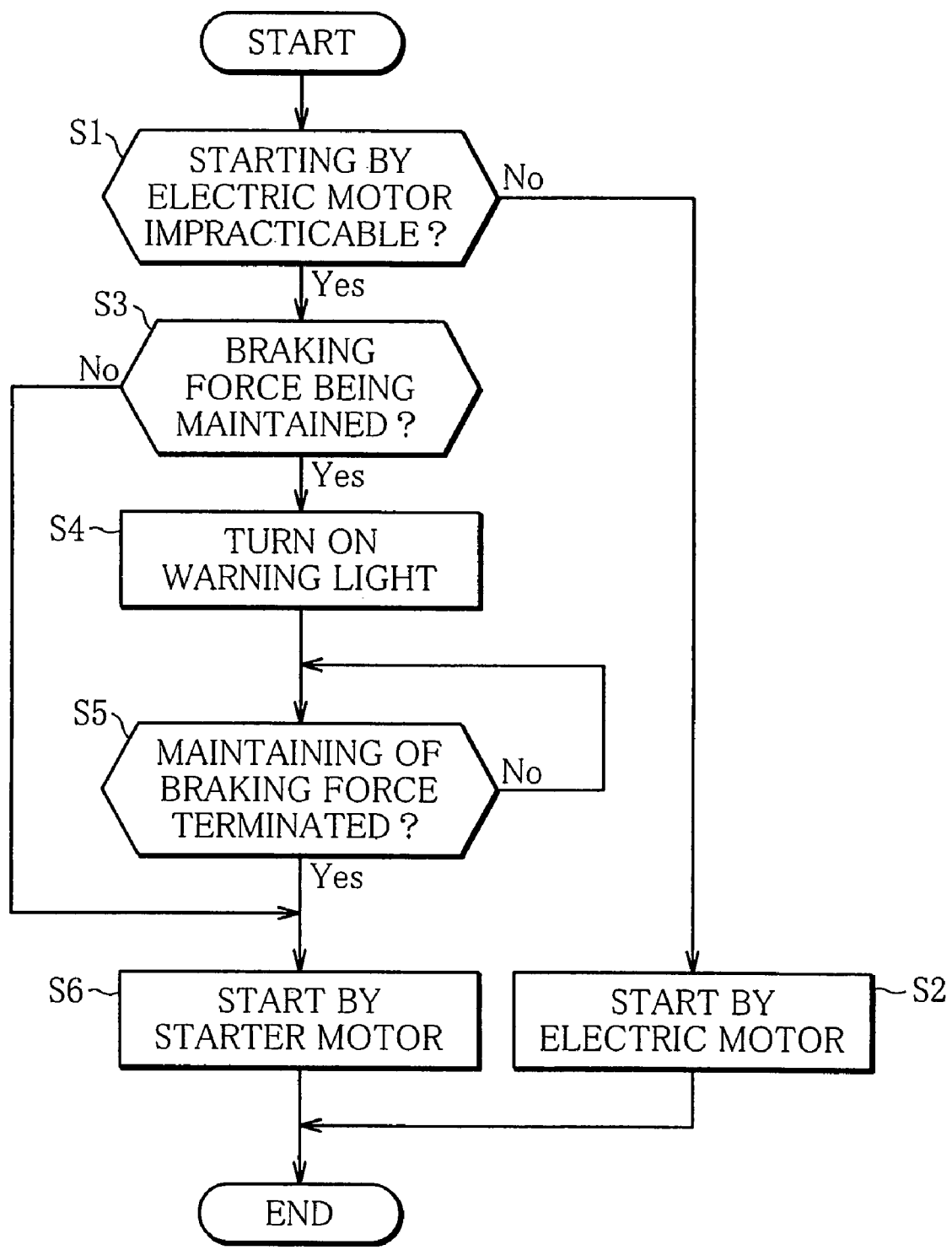
FIG. 3 is a flow chart of an engine start control performed in the hybrid electric vehicle of FIG. 1.

The vehicle ECU 22 performs an engine start control according to the flow chart of FIG. 3, thereby appropriately switching between starting of the engine 2 using the above-described starter motor 44 and starting of the engine 2 by the electric motor 6.

This engine start control is started when the starter switch 48 is put in the engine start position, or when a request for starting the engine 2 is made under the idling stop control.

When the engine start control is started, the engine ECU 22 first determines in Step S1 whether or not the vehicle is in a specified condition (specified abnormal condition) which makes the starting of the engine 2 by the electric motor 6 impracticable (abnormality detection means).

In Step S1, the vehicle ECU 22 checks first to fourth conditions as the specified conditions which make the starting of the engine 2 by the electric motor 6 impracticable.

The first condition relates to electric power that the battery 18 can output. The battery 18 gradually deteriorates with use, and the electric power the battery 18 can output gradually decreases. Thus, the vehicle ECU 22 obtains an internal resistance of the battery 18 based on a voltage and a current of the battery 18, which are detected and fed from the battery ECU 28, and calculates, from a variation in the internal resistance, a deterioration factor indicating a degree of deterioration of the battery 18. Then, by multiplying the electric power that the new battery 18 can output by the deterioration factor, the vehicle ECU 22 obtains electric power that the present battery 18 can output. The vehicle ECU 22 further calculates a torque producible by the electric motor 6 supplied with this electric power.

In the vehicle ECU 22, there is stored in advance a starting torque which is set to be slightly greater than an output torque of the electric motor 6 required to start the engine 2 by the electric motor 6. When the torque producible by the electric motor 6 is less than the starting torque, the vehicle ECU 22 determines that the starting of the engine 2 by the electric motor 6 is impracticable.

The second condition relates to the temperature of the engine 2. When the temperature of the engine 2 drops to a great degree in a cold region or the like, the viscosity of lubricant for the engine 2 increases, so that the torque required to start the engine 2 increases. Thus, when a temperature of the engine 2 detected by an engine temperature sensor 50 for detecting the temperature of the engine 2 is lower than a predetermined temperature, the vehicle ECU 22 determines that the starting of the engine 2 by the electric motor 6 is impracticable.

The third condition relates to the temperature of the electric motor 6 and of the inverter 20. When the temperature of the electric motor 6 drops to a great degree in a cold region or the like, the viscosity of lubricant for the electric motor 6 increases, so that the torque producible by the electric motor 6 decreases. Further, when the temperature of the electric motor 6 or the inverter 20 rises to a great degree, the electric motor 6 cannot produce a normal torque. Thus, when the temperature of the electric motor 6 or the inverter 20 fed from the inverter ECU 26 is out of a predetermined range, the vehicle ECU 22 determines that the starting of the engine 2 by the electric motor 6 is impracticable.

The fourth condition relates to a failure of the electric motor 6, the battery 18, the inverter 20, the battery ECU 28 or the inverter ECU 26. If any of these devices has a failure, the electric motor 6 cannot be operated normally. Thus, the vehicle ECU 22 determines that the starting of the engine 2 by the electric motor 6 is impracticable.

If the vehicle ECU 22 determines in Step S2 that the vehicle is not in any of these four conditions so that the starting of the engine 2 by the electric motor 6 is not impracticable but possible, the vehicle ECU 22 starts the engine 2 by means of the electric motor 6 in Step S2. Specifically, after confirming that the transmission 8 is in neutral position so that the electric motor 6 and the driving wheels 16 are mechanically disconnected, and that the clutch 4 is engaged, the vehicle ECU 22 feeds to the inverter ECU 26 an instruction designating an output torque of the electric motor 6 required to start the engine 2. The vehicle ECU 22 further instructs the engine ECU 24 to operate the engine 2.

Based on the instruction from the vehicle ECU 22, the inverter ECU 26 operates the electric motor 6 as a motor to produce the torque designated by the vehicle ECU 22, thereby cranking the engine 2. At this time, the engine ECU 24 starts fuel supply to the engine 2, so that the engine 2 starts operating. With this, the engine start control ends.

In this engine start control, if a request for starting the engine 2 is made by putting the starter switch 48 in the engine start position, the vehicle ECU 22 activates the solenoid 50b of the cut relay 50, thereby opening the contact 50a. Consequently, no electric power is supplied from the power-source battery 46 to the starter motor 44, so that the engine 2 is prevented from being started by the electric motor 6 and the starter motor 44 at the same time.

Meanwhile, if the vehicle ECU 22 determines in Step S2 that the vehicle is in any of the first to fourth conditions so that the starting of the engine 2 by the electric motor 6 is impracticable, the vehicle ECU 22 determines in Step S3 whether or not the braking force is being maintained by activating the solenoid of the solenoid valve 40.

When the braking force is being maintained by activating the solenoid valve 40, starting the engine 2 by the starter motor 44 may cause a temporary drop in voltage of the power-source battery 46, thereby accidentally breaking off the maintaining of the braking force. Thus, in Step S4, the vehicle ECU 22 turns on a warning light (warning means) 54 provided on an instrument panel (not shown) in the vehicle compartment. With the warning light on, there is displayed a warning to the effect that the starting of the engine 2 by the electric motor 6 is difficult and that the starting of the engine 2 by the starter motor 44 is not allowed to be carried out since the braking force is being maintained.

Then in Step S5, the vehicle ECU 22 determines whether or not the maintaining of the braking force by the activation of the solenoid valve 40 has been terminated. When the maintaining of the braking force by the activation of the solenoid valve 40 has not been terminated, the vehicle ECU 22 repeats the procedure of Step S5, so that the engine start control is in a stand-by mode. Consequently, the starting of the engine 2 is suspended.

With the warning light 54 on, the driver can easily recognize that the starting of the engine 2 by the starter motor 44 is not allowed since the braking force is being maintained. Thus, in order to make the starting of the engine 2 practicable, the driver performs an operation to terminate the maintaining of the braking force. Specifically, as already mentioned, for example when the driver operates the parking brake 42 to produce a braking force or depresses the brake pedal 38 again, the solenoid of the solenoid valve 40 is deactivated, so that the maintaining of the braking force by the activation of the solenoid valve is terminated.

When the maintaining of the braking force is terminated in this manner, the vehicle ECU 22 advances the procedure from Step S5 to Step S6 to be out from the stand-by mode and to cause the engine 2 to be started by the starter motor 44. Specifically, the vehicle ECU 22 instructs the engine ECU 24 to operate the engine 2, and at the same time, supplies electric power from the power-source battery 46 to the starter motor 44. Supplied with electric power from the power-source battery 44, the starter motor 44 cranks the engine 2.

Here, if a request for starting the engine 2 is made by manipulating the starter switch 48, the vehicle ECU 22 closes the contact 50a of the cut relay 50 by deactivating the solenoid 50b of the cut relay 50. At this time, since the starter switch 48 is in the engine start position, the contact of the starter switch 48 is closed. Thus, electric power is supplied from the power-source battery 46 to the starter motor 44 so that the starter motor 44 operates.

Meanwhile, if a request for starting the engine 2 was made under the idling stop control, the vehicle ECU 22 closes the contact 52a of the control relay 52 by activating the solenoid 52b of the control relay 52. Electric power is supplied from the power-source battery 46 to the starter motor 44 through the closed contact 52a so that the starter motor 44 operates.

Then, receiving the instruction from the vehicle ECU 22, the engine ECU 24 starts fuel supply to the engine 2 so that the engine 2 starts operating. With this, the engine start control ends.

If in Step S3, the vehicle ECU 22 determines that the solenoid valve 40 is not activated, namely the braking force is not being maintained, the operation of the starter motor 40 does lead to break-off of the maintaining of the braking force. Thus, in Step S6, the vehicle ECU 22 causes the engine 2 to be started by the starter motor 44 in the above-described manner.

As clear from the above, when a request for starting the engine 2 is made by manipulating the starter switch 42 or under the idling stop control, if the vehicle ECU 22 determines that the starting of the engine 2 by the electric motor 6 is impracticable, the vehicle ECU 22 causes the engine 2 to be started by the starter motor 44 when the braking force is not being maintained by the activated solenoid valve 40. Thus, it is possible to prevent the problem that the operation of the starter motor 44 causes a drop in voltage of the power-source battery 46, thereby accidentally breaking off the maintaining of the braking force.

The maintaining of the braking force by the activated solenoid valve 40 is terminated by operating the parking brake 42 to produce a braking force or depressing the brake pedal 38. Thus, when a request for starting the engine 2 is made, if the braking force is being maintained by the activated solenoid valve and if the starting of the engine 2 by the electric motor 6 is impracticable, the starting of the engine 2 by the starter motor 44 is suspended until the parking brake 42 is operated to produce a braking force or the brake pedal 38 is depressed. Consequently, after the maintaining of the braking force by the activated solenoid valve 40 is terminated, the engine 2 can be started, continuously maintaining a braking force on the vehicle.

When a request for starting the engine 2 is made by manipulating the starter switch 42 or under the idling stop control, if the starting of the engine 2 by the electric motor 6 is impracticable and if the braking force is being maintained by the activated solenoid valve 40, the vehicle ECU 22 turns on the warning light 54. Thus, the driver can easily recognize that the starting of the engine 2 by the starter motor 44 is not allowed to be carried out since the control for maintaining the braking force is being performed. If the driver notices the warning light turned on and performs an operation to terminate the maintaining of the braking force by the activated solenoid valve 40 in the above-mentioned manner, the engine 2 can be caused to be started by the starter motor 44 with certainty.

In the present embodiment, the warning light 54 is turned on to display the warning to the effect that the starting of the engine 2 by the electrical motor 6 is impracticable and that the starting of the engine 2 by the starter motor 44 is not allowed to be carried out since the braking force is being maintained by the activated solenoid valve 40. The way of giving a warning is not limited to this. For example, the warning may be given in voice, in the combination of light and voice or the like.

In the above, an embodiment of the control device for the hybrid electric vehicle according to the present invention has been described. The present invention is, however, not limited to the described embodiment.

For example, the described embodiment can be modified such that, if prior to the idling stop control, it is determined that the starting of the engine 2 by the electric motor 6 is impracticable, the vehicle ECU 22 does not perform the idling stop control. In this modified case, if the starting of the engine 2 by the electric motor 6 is impracticable, the engine 2 continues operating unless the starter switch 48 is put in the engine stop position. Consequently, it is only when the starter switch is put in the engine start position that the starting of the engine 2 by the starter motor 44 may become necessary. This reduces the frequency that the termination of the maintaining of the braking force becomes necessary to start the engine 2.

In the described embodiment, the electric motor 6 is disposed between the clutch 4 and the transmission 8. The location of the electric motor 6 is, however, not limited to this. For example, the hybrid electric vehicle may have an electric motor 6 disposed between the engine 2 and the clutch 4.

In the described embodiment, the vehicle ECU 22 checks four conditions which make the starting of the engine 2 by the electric motor 6 impracticable. The conditions which make the starting of the engine 2 by the electric motor 6 impracticable are, however, not limited to these. The vehicle ECU 22 may check other conditions which are thought to prevent the electric motor 6 from operating normally as the conditions which make the starting of the engine 2 by the electric motor 6 impracticable, such that the SOC of the battery 18 has lowered so that the electric motor 6 cannot produce a torque required to start the engine 2, and that the vehicle ECU 22 cannot transfer information to and from the inverter ECU 26, the battery ECU 28 or the like.

In the described embodiment, the engine 2 is a diesel engine. The type of the engine is, however, not limited to this. The engine can be a gasoline engine or the like.

In the described embodiment, the electric motor 6 is a permanent-magnetic synchronous motor. The type of the electric motor is, however, not limited to this.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A control device for a hybrid electric vehicle arranged such that a driving force of an electric motor is transmitted to driving wheels and that a rotary shaft of the electric motor is coupled with an output shaft of an engine, comprising:
    a starter motor provided separately from the electric motor to start the engine by transmitting a starter motor driving force to the output shaft of the engine;
    a battery that supplies electric power to the electric motor;
    an electric power source provided separately from the battery to supply electric power to the starter motor;
    a braking force maintaining unit that is activated by the electric power from the electric power source to maintain a braking force on the vehicle;
    an abnormality detection unit for detecting a specified abnormal condition which makes the starting of the engine by the electric motor impracticable; and
    a control unit which, in a case where a request for starting the engine is made, if the abnormality detection unit does not detect the abnormal condition, causes the engine to be started by the electric motor, and if the abnormality detection unit detects the abnormal condition, causes the engine to be started by the starter motor when the braking force maintaining unit is not active,
    wherein when a request for starting the engine is made, if the abnormality detection unit detects the abnormal condition and if the braking force maintaining unit is active, the control unit suspends the starting of the engine by the starter motor until the braking force maintaining unit is deactivated, and thereafter causes the engine to be started by the starter motor.

2. The control device for a hybrid electric vehicle according to claim 1, further comprising
    a parking brake that is operated by a driver of the vehicle to produce a braking force on the vehicle, wherein
    when a request for starting the engine is made, if the abnormality detection unit detects the abnormal condition and if the braking force maintaining unit is active, the control unit suspends the starting of the engine by the starter motor until the parking brake is operated to produce a braking force on the vehicle and thereby the braking force maintaining unit is deactivated.

3. The control device for a hybrid electric vehicle according to claim 1, further comprising
    a brake pedal that is depressed by a driver of the vehicle to produce a braking force on the vehicle, wherein
    when a request for starting the engine is made, if the abnormality detection unit detects the abnormal condition and if the braking force maintaining unit is active, the control unit suspends the starting of the engine by the starter motor until the brake pedal is depressed and thereby the braking force maintaining unit is deactivated.

4. The control device for a hybrid electric vehicle according to claim 1, further comprising
    a warning unit for giving a warning, if the abnormality detection unit detects the abnormal condition and if the braking force maintaining unit is active when a request for starting the engine is made.

* * * * *